US009780570B2

(12) United States Patent
Anders (10) Patent No.: US 9,780,570 B2
(45) Date of Patent: Oct. 3, 2017

(54) PROVIDING A VEHICLE WITH ELECTRIC ENERGY USING INDUCTION AND A RECTIFIER

(71) Applicant: Bombardier Transportation GmbH, Berlin (DE)

(72) Inventor: Dominik Anders, Mannheim (DE)

(73) Assignee: Bombardier Transportation GmbH, Berlin (DE)

( * ) Notice: Subject to any disclaimer, the term of this patent is extended or adjusted under 35 U.S.C. 154(b) by 434 days.

(21) Appl. No.: 14/379,119

(22) PCT Filed: Feb. 18, 2013

(86) PCT No.: PCT/EP2013/053174
§ 371 (c)(1),
(2) Date: Aug. 15, 2014

(87) PCT Pub. No.: WO2013/121040
PCT Pub. Date: Aug. 22, 2013

(65) Prior Publication Data
US 2015/0263527 A1 Sep. 17, 2015

(30) Foreign Application Priority Data

Feb. 17, 2012 (GB) .................................. 1202853.6

(51) Int. Cl.
*B60R 16/023* (2006.01)
*H02J 5/00* (2016.01)
(Continued)

(52) U.S. Cl.
CPC ............. *H02J 5/005* (2013.01); *B60L 11/182* (2013.01); *B60L 11/1812* (2013.01);
(Continued)

(58) Field of Classification Search
USPC .................................................. 307/9.1, 10.1
See application file for complete search history.

(56) References Cited

U.S. PATENT DOCUMENTS 5,642,270 A * 6/1997 Green ................... B60L 11/126
363/17
6,005,304 A 12/1999 Seelig
(Continued)

FOREIGN PATENT DOCUMENTS

CN 101626915 A 1/2010
CN 102177044 A 9/2011
(Continued)

Primary Examiner — Rexford Barnie
Assistant Examiner — Xuan Ly
(74) Attorney, Agent, or Firm — The Webb Law Firm (57) ABSTRACT

An arrangement for providing a vehicle, in particular a track bound and/or road vehicle, with electric energy, comprising a receiving device 1 adapted to receive an alternating electromagnetic field and produce an alternating electric current by electromagnetic induction. The receiving device comprises three phase lines, 2a, 2b, 2c, connected on one side to a common star point 5, and on the other side to a bridge rectifier 10. Each phase line includes an inductance 3a, 3b, 3c and a capacitance 4a, 4b, 4c having a resonant frequency. The rectifier comprises a number of controllable switches 12, 13 and a control device to switch the switches on and off at a frequency smaller than the resonant frequency. During operation the incident electromagnetic field induces a voltage in the inductances and a corresponding alternating current flows through the phase lines, is rectified by the rectifier, and is provided to the load 17.

15 Claims, 4 Drawing Sheets

(51) Int. Cl.
  *B60L 11/18* (2006.01)
  *B60M 7/00* (2006.01)
  *B60L 15/00* (2006.01)
  *H02J 7/02* (2016.01)
  *H02M 7/219* (2006.01)
  *H02J 17/00* (2006.01)

(52) U.S. Cl.
  CPC ........... *B60L 15/007* (2013.01); *B60M 7/003* (2013.01); *B60R 16/023* (2013.01); *H02J 7/025* (2013.01); *B60L 2200/26* (2013.01); *B60L 2210/22* (2013.01); *B60L 2210/30* (2013.01); *B60L 2240/527* (2013.01); *B60L 2240/529* (2013.01); *H02J 17/00* (2013.01); *H02M 7/219* (2013.01); *Y02T 10/645* (2013.01); *Y02T 10/7005* (2013.01); *Y02T 10/7072* (2013.01); *Y02T 10/725* (2013.01); *Y02T 10/7241* (2013.01); *Y02T 90/122* (2013.01); *Y02T 90/127* (2013.01); *Y02T 90/14* (2013.01)

(56) References Cited

U.S. PATENT DOCUMENTS

| | | |
|---|---|---|
| 6,038,152 A | 3/2000 | Baker |
| 6,621,138 B1 | 9/2003 | Alter |
| 2010/0102628 A1 | 4/2010 | Soma et al. |
| 2011/0231029 A1 | 9/2011 | Ichikawa et al. |
| 2011/0253495 A1 | 10/2011 | Vollenwyder et al. |
| 2012/0019174 A1 | 1/2012 | Mahlein et al. |
| 2012/0032633 A1 | 2/2012 | Cordes et al. |

FOREIGN PATENT DOCUMENTS

| | | | |
|---|---|---|---|
| DE | 4446779 | A1 | 6/1996 |
| DE | WO 2010/031593 | * | 3/2010 |
| EP | 0596988 | B1 | 6/1997 |
| GB | 2463693 | A | 3/2010 |
| GB | 2474867 | A | 5/2011 |
| JP | 33664 | A | 1/1991 |
| JP | 8228443 | A | 9/1996 |
| JP | 2002320347 | A | 10/2002 |
| JP | 2011229347 | A | 11/2011 |
| WO | 9302887 | A1 | 2/1993 |
| WO | 2009074207 | A2 | 6/2009 |
| WO | 2010031595 | A2 | 3/2010 |
| WO | 2010108623 | A1 | 9/2010 |
| WO | 2012021072 | A1 | 2/2012 |

* cited by examiner

PROVIDING A VEHICLE WITH ELECTRIC ENERGY USING INDUCTION AND A RECTIFIER

CROSS-REFERENCE TO RELATED APPLICATIONS

This application is the United States national phase of International Application No. PCT/EP2013/053174 filed Feb. 18, 2013, and claims priority to Great Britain Patent Application No. 1202853.6 filed Feb. 17, 2012, the disclosures of which are hereby incorporated in their entirety by reference.

BACKGROUND OF THE INVENTION

Field of the Invention

The invention relates to an arrangement for providing a vehicle, in particular a track bound vehicle and/or a road automobile, with electric energy, wherein the arrangement comprises a receiving device adapted to receive an alternating electromagnetic field and to produce an alternating electric current by electromagnetic induction (i.e. magnetic induction which is caused by an electromagnetic field and the induction produces electric energy). The receiving device comprises at least one inductance which is formed by an electrically conducting material for producing one phase of the alternating electric current by the electromagnetic induction. The at least one inductance and optionally at least one further electrical element (in particular a capacitance), which is connected (in particular in series) to the inductance in order to produce one phase of the alternating electric current, comprise(s) a resonance frequency at which the phase of the alternating electric current is produced if an alternating electromagnetic field of corresponding frequency is received by the receiving device. The inductance is connected to a rectifier for rectifying the alternating electric current and thereby producing a direct electric current. As a skilled person will know, the resonance frequency at which the phase of the alternating electric current is produced may vary depending on the inductive coupling between the receiving device and the device which generates the electromagnetic field.

Furthermore, the invention relates to a system for transferring energy to a vehicle, wherein the system comprises the arrangement, and relates to a vehicle comprising the arrangement. The invention also relates to a method of manufacturing the arrangement and to a method of operating a vehicle by means of a receiving device which receives an alternating electromagnetic field and produces an alternating electric current by magnetic induction.

Description of Related Art

WO 2010/031595 A2 discloses an arrangement for providing a vehicle, in particular a track bound vehicle, with electric energy, wherein the arrangement comprises a receiving device adapted to receive an alternating electromagnetic field and to produce an alternating electric current by electromagnetic induction. The receiving device comprises a plurality of windings and/or coils of electrically conducting material, wherein each winding or coil is adapted to produce a separate phase of the alternating electric current.

The present invention can be applied to any land vehicle (including, but not preferably, any vehicle which is only temporarily on land), in particular track bound vehicles, such as rail vehicles (e.g. trams), but also to road automobiles, such as individual (private) passenger cars or public transport vehicles (e.g. busses, including trolleybuses which are also track bound vehicles). Preferably, the primary side conductor arrangement which produces the alternating electromagnetic field is integrated in the track or road of the vehicle so that the electric lines of the primary side conductor arrangement extend in a plane which is nearly parallel to the surface of the road or track on which the vehicle may travel. As also described by WO 2010/031595 A2, the receiving device can be located at the underside of a vehicle and may be covered by a ferromagnetic body, such as a body in the shape of a slab or plate. A suitable material is ferrite. The body bundles and redirects the field lines of the magnetic field and therefore reduces the field intensity above the body to nearly zero. However, other configurations, locations and/or orientations of the primary side conductor arrangement are possible. For example, the primary side conductor arrangement may be located sideways of the vehicle.

In any case, the gap between the primary side conductor arrangement and the at least one inductance of the receiving device should be as small as possible, since the efficiency of the wireless energy transfer between primary and secondary side is smaller for larger gaps. For the same reason, the voltage which is induced in the at least one inductance depends on the size of the gap. One way to handle the varying voltage on the secondary side of the system is to supply the electric energy to power consumers only, which are voltage-tolerant, i.e. can be operated in a wide range of voltages. One example, to which the present invention can be applied, is the traction system of a rail vehicle which comprises a direct current intermediate circuit connected to the receiving device and which further comprises at least one inverter which inverts the direct current to an alternating current for operating at least one traction motor of the vehicle. The inverter can be controlled to compensate for voltage fluctuations in the direct current intermediate circuit.

However, there are other electric systems or devices in vehicles which cannot tolerate the varying voltage. A further possibility of providing the energy to the vehicle and using it is therefore to control the size of the gap between primary and secondary side inductances in order to keep the voltage fluctuations within a small range of voltages.

WO 2009/074207 A2 describes a system for contactless energy transmission to a part of the system, in particular a movably arranged part of the system, and a method, where a stationarily installed primary conductor is provided to which one or several secondary coils enclosed by said part are inductively coupled. The secondary coils are connected in series with one or several capacitors such that the resonance frequency of the thus formed series resonant circuit is essentially equal to the frequency of an alternating current injected into the primary conductor, wherein the voltage occurring at the series resonant circuit is fed to a rectifier, on the output side of which a switch is provided which can be actuated as a short-circuiter, the current not passing through the switch being fed to a smoothing capacitor via a free-wheeling diode and the voltage occurring at the smoothing capacitor being made available to a user.

A disadvantage of this secondary side arrangement is the free-wheeling diode which increases losses during operation. Furthermore, the embodiment shown in FIG. 1 of WO 2009/074207 A2 has the disadvantage that an electric current always flows through a series connection of two semi-conductors, namely the free-wheeling diode and one of the diodes in the rectifier and consequently, electric losses are increased.

SUMMARY OF THE INVENTION

It is an object of the present invention to provide an arrangement for providing a vehicle with electric energy, wherein the arrangement comprises a receiving device comprising an inductance for producing an alternating electric current by electromagnetic induction and wherein the arrangement provides means for reducing voltage fluctuation. Compared to known solutions, losses during operation shall be reduced. In particular, the arrangement shall also provide means for minimizing losses which may be caused by the means for reducing voltage fluctuations. Further objects of the invention are to provide a corresponding system for transferring energy to a vehicle, a vehicle which comprises the arrangement, a method of operating the vehicle and a method of manufacturing the arrangement.

It is a basic idea of the present invention to integrate at least one switch in the rectifier. In contrast to WO 2009/074207 A2, the switch is not provided on the output side of the rectifier. Consequently, the additional free-wheeling diode can be omitted. The at least one switch which is integrated in the rectifier is operated to produce a short circuit across the inductance or across two or more of the inductances of the receiving device which is adapted to receive the alternating electromagnetic field and to produce an alternating electric current by electromagnetic induction. In particular, the following is proposed: An arrangement for providing a vehicle, in particular a track bound vehicle and/or a road automobile, with electric energy, wherein the arrangement comprises a receiving device adapted to receive an alternating electromagnetic field and to produce an alternating electric current by electromagnetic induction, the receiving device comprises at least one inductance which is formed by an electrically conducting material for producing one phase of the alternating electric current by the electromagnetic induction, the at least one inductance and optionally at least one further electrical element, which is connected to the inductance in order to produce one phase of the alternating electric current, comprise(s) a resonance frequency at which the phase of the alternating electric current is produced if an alternating electromagnetic field of corresponding frequency is received by the receiving device, the inductance and optionally the at least one further electrical element is/are connected to a rectifier for rectifying the alternating electric current and thereby producing a direct electric current, the rectifier comprises at least one automatically controllable switch which is or—in case of more than one automatically controllable switch—which are arranged in such a manner that closing the switch (i.e. switching it on) or closing a plurality of the switches results in a short circuit across the inductance or across two or more of the inductances, optionally including the at least one further electrical element(s), the arrangement comprises a control device which is adapted to control the at least one automatically controllable switch and the control device is adapted to switch on (i.e. close the switch) and off (i.e. open the switch) the at least one automatically controllable switch at a frequency which is smaller than the resonance frequency.

Compared to the prior art mentioned above, the at least one switch is connected in parallel to a one-way valve (in particular a diode) of the rectifier or, alternatively, the switch is integrated in the one-way valve (for example, an IGBT or MOSFET can be used which has an integrated diode, a so-called body-diode), wherein the respective valve of the rectifier is adapted to conduct an electric current in one direction only, so that—if the switch is on—an electric current can flow in the opposite direction through the valve or can bypass the valve in the opposite direction. If the switch is connected in parallel to the (first) one-way valve and if the rectifier comprises a bridge having two one-way valves connected in series to each other, the switch is also connected in series to the other (second) one-way valve.

Preferably, the arrangement produces more than one phase (e.g. three phases) of the alternating current due to electromagnetic induction in a corresponding number of phase lines. A plurality of phases provides for a smoother direct current on the output side of the rectifier. Furthermore, plural phase receivers can produce higher power and stray effects can be reduced.

In particular, the receiving device comprises a plurality of phase lines of electrically conducting material, wherein each phase line comprises one of the inductances, each inductance being adapted to produce one of a plurality of phases of the alternating electric current and wherein the phase lines are connected to each other to form a star point connection at one end of the phase line and are connected to the rectifier at the opposite end of the phase line.

In particular, each of the opposite ends of the phase lines is connected to one of a plurality of bridges of the rectifier, wherein each bridge comprises two one-way valves which are connected in series to each other, wherein each valve is adapted to conduct an electric current in one direction only and wherein at least one of the valves of each bridge is a combined with one of the automatically controllable switches, so that—if the switch is on—an electric current can flow in the opposite direction through the valve or can bypass the valve in the opposite direction. The same applies to a full-bridge rectifier in case of a single-phase receiving device.

The at least one automatically controllable switch may be combined with a valve (e.g. may be integrated in the valve or may connected in parallel to the valve) of the rectifier, wherein the valve is adapted to conduct an electric current in one direction only and wherein—if the switch is on—an electric current can flow in the opposite direction through the valve or can bypass the valve in the opposite direction, wherein the control device is adapted to enable switching on the switch only while the size of the electric current through the valve is zero or is smaller than a predetermined threshold value. Losses during operation can be reduced significantly by this embodiment. This is possible since the control device is adapted to switch the at least one automatically controllable switch at a switching frequency which is smaller than the resonance frequency. With this switching frequency, the at least one switch is switched on. Also the at least one switch is switched off with this switching frequency. Since the time interval between switching on and switching off the switch in general differs from the time interval between the switching off and switching on the switch, and since these time intervals can be varied, different ratios of these time intervals or duty cycles (see below) can be set.

According to a preferred embodiment, in order to enable both switching on and the switching off the at least one switch while the size of the electric current through the valve(s) is zero or is smaller than a predetermined threshold value, the switching frequency is an integer fraction of the resonance frequency, i.e. the resonance frequency is an integer multiple of the switching frequency. In particular, the integer fraction can be predefined, i.e. can be set before operation of the receiving device. This does not exclude adapting the integer fraction to another value during operation.

In particular, the resonance frequency or an equivalent quantity can be determined during operation. Therefore, the resonance frequency can be a precise integer multiple of the switching frequency during operation. For example, if the resonance frequency changes, the switching frequency is adapted correspondingly and preferably automatically. The equivalent quantity may be the time of a period or half period of the alternating current or alternating voltage on the input side of the rectifier, e.g. the alternating current or alternating voltage of one or more than one phase of the receiving device. For example, a detector which is coupled to a counter measures repeatedly when the alternating current or alternating voltage becomes zero and a calculation device calculates the resonance frequency. However, it is also possible that the frequency of the alternating current or alternating voltage triggers the generation of the switching frequency in a different manner.

The control device may comprises a controller which is adapted to control the ratio of the time intervals while the at least one automatically controllable switch is on—and therefore the short circuit exists—to the time intervals while the at least one automatically controllable switch is off. Due to the timing of the switching process, the electric losses which would be produced within the switch and valve otherwise are reduced significantly. Furthermore, the switch produces less heat and cooling of the switch is facilitated.

In particular, the control device may be adapted to control the switching of the at least one automatically controllable switch depending on the size(s) of the voltage and/or current on the direct current side of the rectifier. An example will be given below.

According to a specific application of the invention, the arrangement comprises a storage for storing electric energy which is delivered by the rectifier, wherein the rectifier is connected to the storage and wherein the control device is adapted to control the switching of the at least one automatically controllable switch depending on the size(s) of the voltage and/or current which is required for charging the storage.

Furthermore, the invention includes a vehicle comprising the arrangement according to one of the embodiments described here, wherein the rectifier is connected to a storage for storing electric energy.

In addition, the invention comprises a method of operating a vehicle, in particular a track bound vehicle and/or a road automobile, using electric energy, wherein
  an alternating electromagnetic field is received and is used to produce an alternating electric current by electromagnetic induction,
  the alternating electromagnetic field is received by at least one inductance which is formed by an electrically conducting material and which produces one phase of the alternating electric current by the electromagnetic induction,
  the inductance and optionally at least one further electrical element, which is connected to the inductance, produce the phase of the alternating electric current at a resonance frequency,
  the alternating electric current is rectified by a rectifier and thereby a direct electric current is produced,
  the rectifier is operated using at least one automatically controllable switch which is or—in case of more than one automatically controllable switch—which are temporarily closed so that a short circuit across the inductance or across two or more of the inductances— optionally including the at least one further electrical element(s)—is effected,
  the at least one automatically controllable switch is to controlled by a control device so that the at least one automatically controllable switch is switched on and off at a frequency which is smaller than the resonance frequency.

In particular, the alternating electric current may be produced using a plurality of phase lines of electrically conducting material, wherein each phase line comprises one of the inductances which produces one of a plurality of phases of the alternating electric current. Other embodiments of the method follow from the description of the arrangement.

For example, the rectifier may comprise a valve which is used to rectify the alternating electric current, wherein the automatically controllable switch is combined with the valve, wherein the valve conducts—in a first operating state while the switch is off—an electric current in one direction only and the valve or a bypass of the valve can conduct—in a second operating state while the switch is on—an electric current in the opposite direction, wherein switching on the switch is enabled only while the size of the electric current through the valve is zero or is smaller than a predetermined threshold value.

The ratio of the time intervals while the at least one automatically controllable switch is on—and therefore the short circuit exists—to the time intervals while the at least one automatically controllable switch is off may be controlled by the control device.

In particular, the control device may control the switching of the at least one automatically controllable switch depending on the size(s) of the voltage and/or current at the direct current side of the rectifier.

Electric energy may be delivered by the rectifier to an energy storage of the vehicle and the control device may control the switching of the at least one automatically controllable switch depending on the size(s) of the voltage and/or current which is required for charging the storage.

The invention includes a method of manufacturing a vehicle, in particular a track bound vehicle and/or a road automobile, comprising the following steps:
  providing a receiving device adapted to receive an alternating electromagnetic field and to produce an alternating electric current by electromagnetic induction,
  providing for the receiving device at least one inductance which is formed by an electrically conducting material for producing one phase of the alternating electric current by the electromagnetic induction,
  adapting the at least one inductance and optionally at least one further electrical element, which is connected to the inductance in order to produce one phase of the alternating electric current, to operate at a resonance frequency at which the phase of the alternating electric current is produced if an alternating electromagnetic field of corresponding frequency is received by the receiving device,
  connecting the inductance and optionally the at least one further electrical element to a rectifier for rectifying the alternating electric current and thereby producing a direct electric current,
  arranging at least one automatically controllable switch of the rectifier in such a manner that closing the switch or closing a plurality of the switches results in a short circuit across the inductance or across two or more of the inductances, optionally including the at least one further electrical element(s),
  providing a control device and adapting the control device so that it is able to control the at least one automatically controllable switch and adapting the control device so that it is able to switch on and off the at least one automatically controllable switch at a frequency which is smaller than the resonance frequency.

BRIEF DESCRIPTION OF THE DRAWINGS

Examples of the invention will be described with reference to the attached figures in the following.

DESCRIPTION OF THE INVENTION

Figure 1:
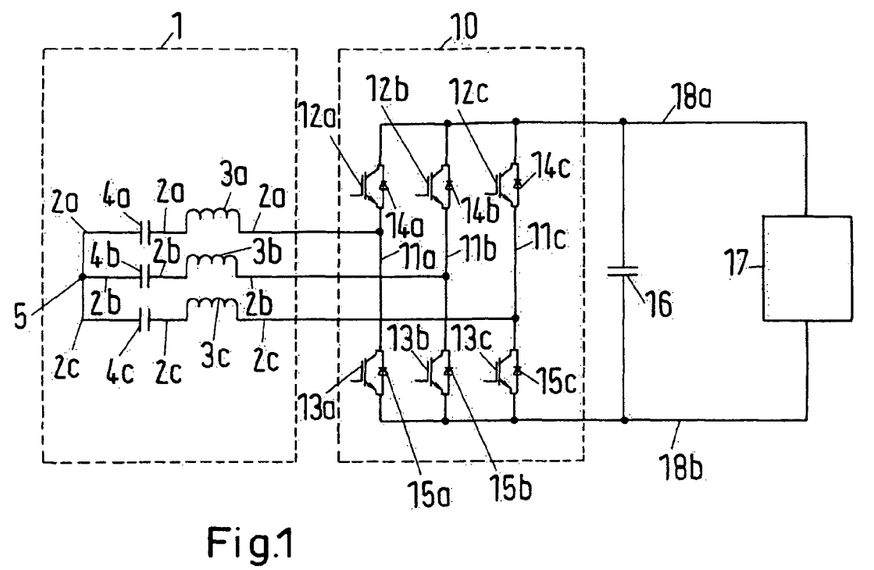
FIG. 1 shows a circuit diagram of a receiving device which is connected to a rectifier, wherein the direct current side of the rectifier is connected to a load, for example to a traction converter via a direct current intermediate circuit.

The receiving device 1 for receiving an electromagnetic field shown in FIG. 1 comprises three phase lines 2a, 2b, 2c which are connected on one side to a common star point 5. The other side of each phase line 2a, 2b, 2c is connected to a respective bridge of a rectifier 10. Each phase line 2a, 2b, 2c comprises an inductance 3a, 3b, 3c which is connected in series to a capacitance 4a, 4b, 4c in order to compensate for the stray inductances which are caused by the inductances 3a, 3b, 3c. Each of the inductances 3 and each of the compensating capacitances 2 can be realized either by a single element (such as an inductor or a capacitor) or by a combination of elements (such as a series connection and/or for a parallel connection of inductors or capacitors). It is also possible that a first part of the inductance 3 of the phase line 2 is connected to a second part of the inductance 3 via a first part or the only part of the capacitance 4.

During operation of the receiving device 1, the incident electromagnetic field induces an electric voltage in the inductances 3a, 3b, 3c, so that there is a voltage across each phase line 2a, 2b, 2c between the star point 5 at one end and the connection to the bridges 11 of the rectifier 10 at the other end. If a load 17 is connected to the direct current side of the rectifier 10 and if the load is operated, a corresponding alternating current flows through the phase lines 2a, 2b, 2c which is rectified by the rectifier 10 and is provided to the load 17 as a direct current through the connecting lines 18a, 18b. The currents through the phase lines 2a, 2b, 2c can be measured as indicated by the measuring devices 36a, 36b, 36c shown in FIG. 3 and FIG. 4 (e.g. using Rogowski-coils).

The inductances 3a, 3b, 3c of the receiving device 1 are preferably arranged in such a manner that the incident electromagnetic field produces electric alternating currents in the phase line 2a, 2b, 2c at a phase shift of 120°, as it is typically the case for a three-phase alternating current.

The rectifier 10 shown in FIG. 1 comprises three bridges 11a, 11b, 11c. Each of the bridges 11 comprises a series connection of two diodes 14a, 15a; 14b, 15b; 14c, 15c. These diodes 14, 15 allow for an electric current from the bottom side shown in FIG. 1 to the topside shown in FIG. 1 so that the electric potential in the current line 18b is higher than in the current line 18a. A smoothing capacitor 16 is connected between the direct current lines 18a, 18b. The smoothing capacitor 16 is connected to the output side of the rectifier, i.e. to the output side of the three bridges 11, and is not a part of the rectifier 10. Each bridge 11 is connected at one end to the first direct current line 18a and at the other end to the second direct current line 18b.

In the specific embodiment shown in FIG. 1, each diode 14, 15 is connected in parallel to a switch 12, 13 so that the switch 12, 13 allows for an electric current bypassing the diode 14, 15 while the switch is on.

During operation of the receiving device 1 and the rectifier 10, the switches 12, 13 may be switched on and off repeatedly in order to increase or decrease the direct current on the output side of the rectifier 10 compared to the normal operation of the rectifier 10. "Normal operation" means that none of the switches 12, 13 is operated. In particular, the switches 12, 13 are operated in such a manner that either the first switches 12a, 12b, 12c or the second switches 13a, 13b, 13c of the bridges 11 are on at the same time. For example, starting at a first operating state while all switches 12, 13 are off, the first switches 12a, 12b, 12c are switched on and are switched off after a certain time interval and then, after a second time interval, the second switches 13a, 13b, 13c are switched on and are switched off after a third time interval. After a fourth time interval the first switches 12a, 12b, 12c are switched on again for the first time interval and so on. For this operation, a duty cycle d can be defined which is the ratio of the sum of the first and third time intervals (while either the switches 12 or the switches 13 are on) to the sum of the second and fourth time intervals (while all switches 12, 13 are off). The voltage on the output side of the rectifier 10 is:

$$U_A = 1/(1-d) * U_E$$

wherein $U_A$ is the direct voltage on the output side of the rectifier 10 across the smoothing capacitor 16 and $U_E$ is the root mean square (RMS) of the three-phase alternating voltage at the connection between the receiving device 1 and the rectifier 10.

In particular, not only related to the circuit diagrams of FIG. 1 to FIG. 5, the switching frequency of the switches 12, 13 is smaller than the frequency of the alternating current produced by the phase lines or phase line of the receiving device. Therefore, it is possible and preferred to switch the switches 12 or 13 on only while the current through the valve (e.g. the diode 14, 15) is zero or is smaller than a predetermined threshold value. Therefore, losses caused by switching the switches 12, 13 under load can be avoided or reduced. For detecting whether the current through the valves are zero or smaller than a predetermined threshold value, the measurement devices 36 mentioned in connection with FIG. 3 and FIG. 4 can be used.

Figure 2:
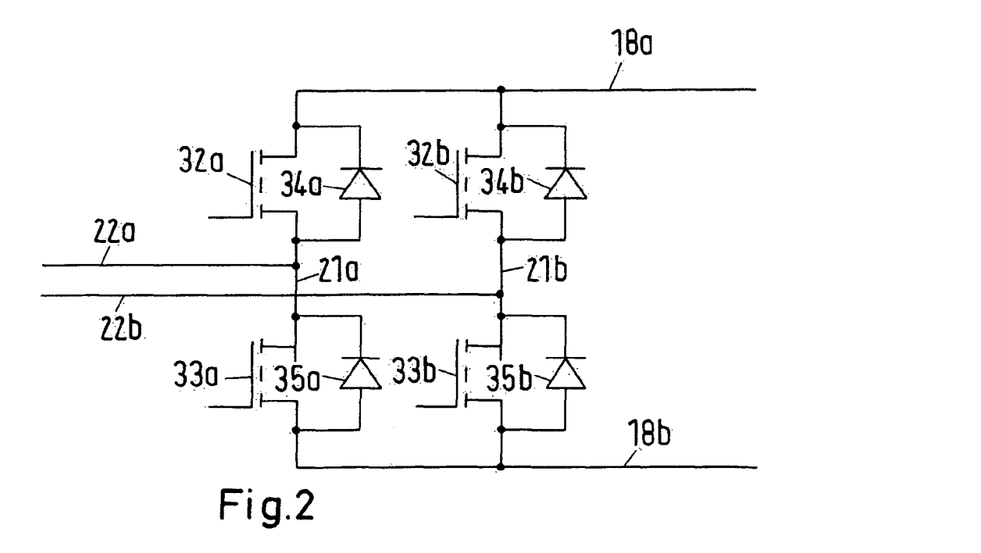
FIG. 2 shows a modified rectifier having two bridges only.

FIG. 2 shows a modified rectifier having two bridges 21a, 21b only. Again, each bridge 21 comprises a series connection of two valves (diodes 34a, 35a; 34b, 35b) and there is a switch 32a, 33a; 32b, 33b in parallel to each valve 34, 35, thereby bypassing the valve while the switch 32, 33 is on.

The phase lines 22a, 22b shown in FIG. 2 may be phase lines of a two-phase alternating current or may be connection lines to a receiver which produces only one phase of an alternating current while an electromagnetic field is incident.

Same reference numerals in the different figures refer to the same or functionally same elements. Therefore, 18a, 18b in FIG. 2 denote direct current lines at the output side of the rectifier.

Figure 3:
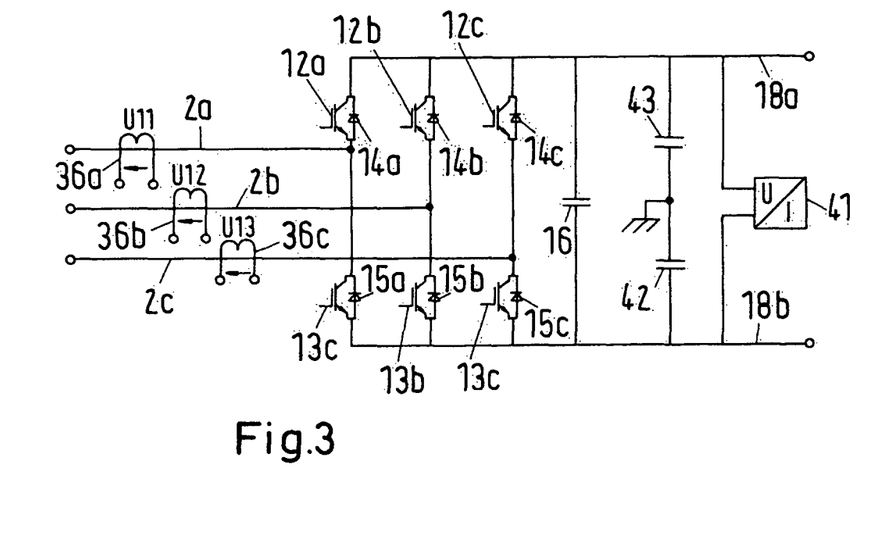
FIG. 3 shows a circuit diagram of an arrangement similar to the arrangement of FIG. 1, wherein measurement devices for measuring the phase currents of the receiving device and for measuring the voltage of the direct current intermediate circuit are shown.
Figure 4:
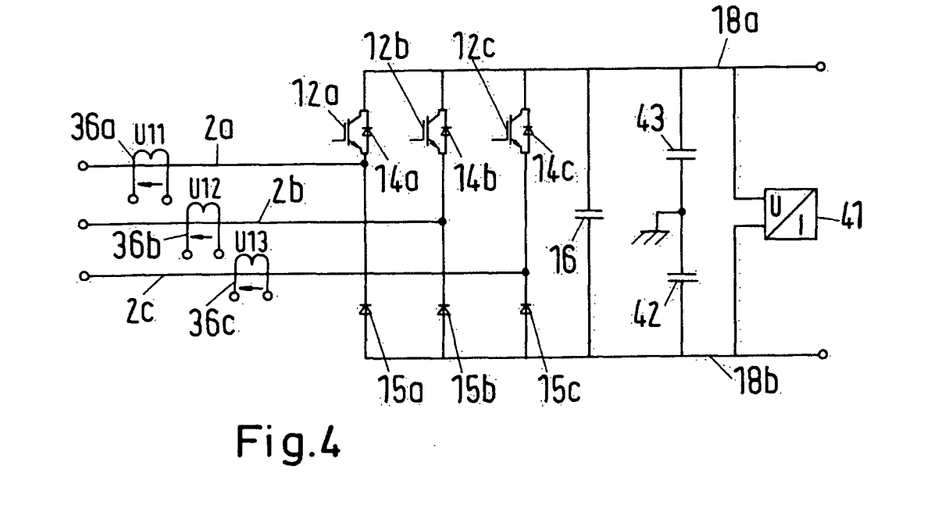
FIG. 4 shows a circuit diagram of an arrangement similar to the arrangement of FIG. 3, wherein each bridge of the rectifier only comprises one switch.

As shown in FIG. 4, one set of the switches (namely the switches 13 of FIG. 1 and FIG. 3) can be omitted. This is based on the finding that only set of switches (e.g. either the switches 12 or the switches 13 of FIG. 1 and FIG. 3) are required to produce a short circuit across the phase lines 2 in order to vary across the inductance 3 and, therefore, to vary the direct voltage on the output side of the rectifier. The same applies to the modified construction of the rectifier shown in FIG. 2 or to any other rectifier. In case of FIG. 2, the switches 32a, 32b can be omitted and the switches 33a, 33b can be switched on and off repeatedly and, preferably, at the same time in order to produce a short circuit across the connection line 22a, 22b or the phase lines 22a, 22b, respectively.

As shown in FIG. 3 and FIG. 4, a series connection of two further capacitances 42, 43 can be connected at their opposite ends to the direct current lines 18a, 18b. Furthermore, a connection point in between the capacitances 42, 43 can be connected to ground potential as indicated in FIG. 3 and FIG. 4. In addition or alternatively, a measuring device 41 can be connected between the direct current lines 18a, 18b. In particular, the measuring device 41 can be adapted to measure the voltage between the lines 18a, 18b and, preferably, also the current through at least one of the lines 18a, 18b. The measurement values delivered by the measuring device 41 can be used to control the operation of the load (e.g. the load 17 of FIG. 1 or another load, such as an energy storage for storing electrical energy) and/or can be used to control the operation of the switches of the rectifier. In particular, based on the measuring values of the measuring device 41, the duty cycle of the switches can be set so that a closed loop control is realized. Therefore, for examples, the direct voltage between the direct current lines 18a, 18b can be controlled to be constant. Alternatively, the voltage and/or current on the output side of the rectifier can be controlled to comply with other requirements of the load or loads.

Figure 5:
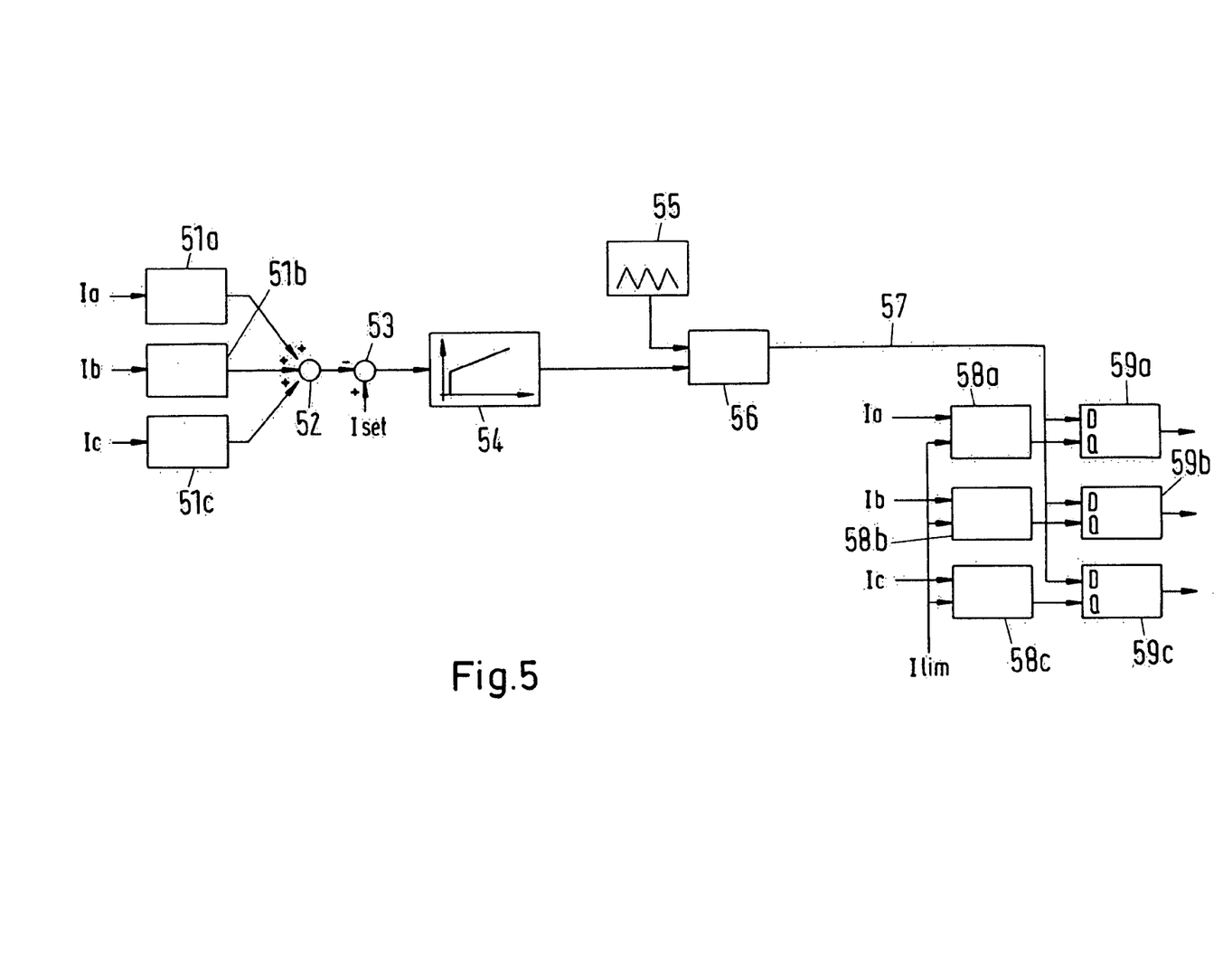
FIG. 5 shows a circuit diagram of a control loop for controlling the switching processes of the switches which are integrated in the rectifier, for example the rectifier of FIG. 1, FIG. 3 or FIG. 4

An example of a control loop for controlling the operation of the switches of a rectifier, such as the rectifier 10 shown in FIG. 1, will be explained with reference to FIG. 5. As mentioned above, the alternating currents through the phase lines of the receiving device are measured, in particular continuously or quasi-continuously. In case of a three-phase receiving device as an example (a corresponding control loop can be realized for any other number of phase lines of the receiving device) the three phase currents of the three-phase alternating current are denoted by Ia, Ib, Ic. These phase currents are input to a first calculating device 51a, 51b, 51c for calculating separately for each phase the root mean square (RMS) of the phase currents. The RMS is output to an adding device 52 for adding the values and outputting the resulting sum to a subtracting device 53 which subtracts the sum from a set value Iset. This set value Iset is produced according to the requirements of the control. For example, the set value may be produced based on the measurement of the direct voltage on the output side of the rectifier as mentioned above.

The difference which is output by the subtracting device 53 is input to a controller 54, which may be a PI-controller (a proportional-integral-controller). The output value of the controller 54 is input to a comparator 56 which compares the output with a triangle-signal produced by a triangle-producing device 55. The frequency of the triangle-signal is equal to the switching frequency which is an integer fraction of the resonance frequency, i.e. the resonance frequency is an integer multiple of the switching frequency.

In particular, the input which is received by the comparator 56 from the controller 54 may be the duty cycle d mentioned above. The resulting output of the comparator 56 is a step-function having two different functional values, namely 1 and 0, which corresponds to the duty cycle. This step-function is fed to individual driving devices 59a, 59b, 59c for driving, for example, the switches 12 and 13 of FIG. 1 or the switches 12 of FIG. 4. In case of having two sets of switches 12, 13, the driving devices 59 are combined with an alternator for driving alternatingly the switches 12 and 13, i.e. the switches 12 are switched on and off before the switches 13 are switched on and off and vice versa.

The output of the comparator 56 is input to a first input D of the driving devices 59 and, preferably, there is a second input value which is input to a second input Q of the driving devices 59, in order to switch the switches on only if the current through the respective valve is zero or is smaller than a predetermined threshold value Ilim. This threshold value Ilim is input to a set of second comparators 58a, 58b. 58c and the measured alternating currents of the phase lines (i.e. the phase currents Ia, Ib, Ic) are also input to the second comparators 58 for each phase separately. The second comparators 58 compare the present value of the alternating current with the threshold value Ilim and output an enable signal to the respective assigned driving device 59 only if the phase current is smaller than the threshold value Ilim or is smaller or equal to the threshold value Ilim.

Figure 6:
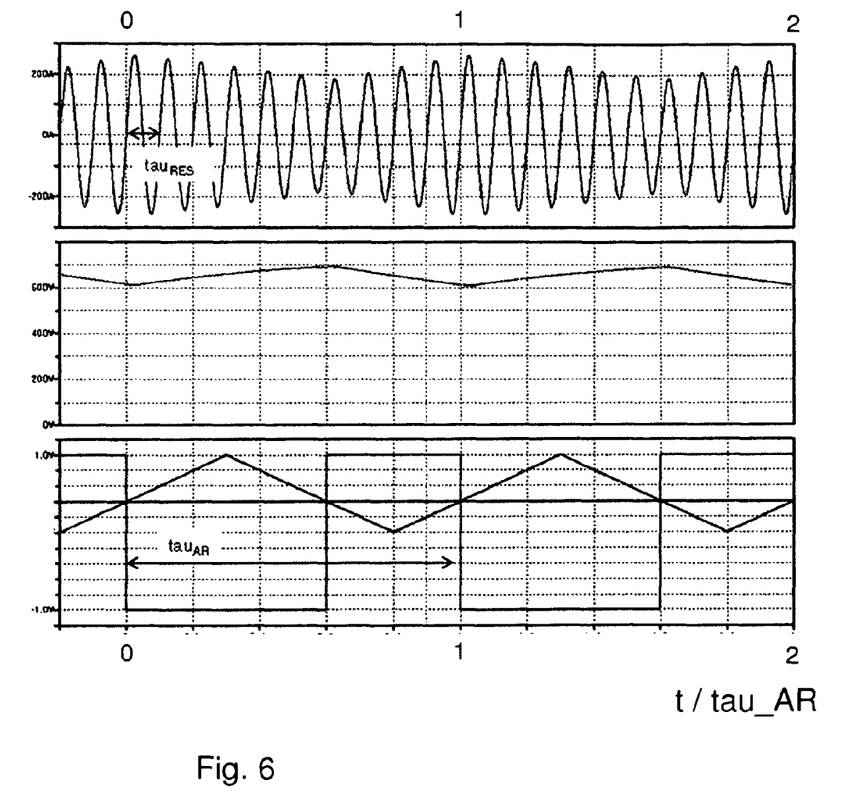
FIG. 6 shows a diagram of quantities as functions of time, with the alternating current produced by a receiving device connected to a rectifier, such as the rectifier shown in FIG. 4, in the upper third of the diagram, with the direct voltage at the output of the rectifier in the middle third of the diagram and with a triangle-signal and a step function indicating the switching state of the switches in the lower third of the diagram.

FIG. 6 shows an example of different quantities as functions of time during operation of an arrangement comprising a receiving device (such as the receiving device shown in FIG. 1) connected to the rectifier shown in FIG. 4. The rectifier of FIG. 4 is chosen for simplicity only. Similar behaviour of the direct voltage on the output side of the rectifier can be achieved with the rectifiers shown in FIG. 1 to FIG. 3 and with modified control of the switches corresponding to the fact that there are two switches in each branch of the rectifier.

The horizontal axis of the diagram corresponds to the normalised time, i.e. the quotient of the time t and the period tau_AR of the cycle of switching on or switching off the switches 12. In the upper third of the diagram, the vertical axis corresponds to the alternating current of the receiving device. A horizontal double arrow illustrates the period tau_RES of the alternating current which fluctuates with the resonance frequency f_RES. In the example, the peak values of the current are in the range of −20 A and 20 A. In the middle third of the diagram, the vertical axis corresponds to the direct voltage of the rectifier. In the example, the values of the voltage vary between 60 V and 70 V. In the lower third of the diagram, the vertical axis corresponds to the voltage of the respective signal and of the threshold value. In the example, the threshold value is 0.4 V and is indicated by a horizontal line at this level. A horizontal double arrow illustrates the period tau_AR of the cycle of switching off the switches 12.

As shown in the upper third of FIG. 6, the alternating current on the input side of the rectifier oscillates with the resonance frequency. For example as described in connection with FIG. 5 above, a triangle-signal (lower third of the diagram in FIG. 6, fluctuating between the peak values 0 V and 1 V) is compared with a threshold value and triggers the switching of the switches 12 of the rectifier. When the triangle-signal falls down below the threshold value (in the example: 0.4 V), the switches 12 are switched on as indicated by the step function in the lower third of the diagram in FIG. 6 stepping up from −1 V to 1 V. When the triangle-signal reaches again the threshold value these switches 12 are switched off again as indicated by the step function stepping down from 1 V to 0 V.

At the points in time when the switches 12 are switched on, the phase lines of the receiving device are shorted. Therefore, the peak value of the alternating current shown in the upper third of the diagram raises during the following periods. In addition, the direct voltage shown in the middle third of the diagram declines. The decline is stopped by switching off the switches 12 again. Afterwards, while the switches 12 are off, the direct voltage raises.

The invention claimed is:

1. An arrangement for providing a vehicle with electric energy, the arrangement comprising:
   a receiving device adapted to receive an alternating electromagnetic field and to produce an alternating electric current by electromagnetic induction, wherein:
   the receiving device comprises at least one inductance which is formed by an electrically conducting material for producing one phase of the alternating electric current by the electromagnetic induction,
   each inductance producing one phase of the alternating electric current at a resonance frequency at which the phase of the alternating electric current is produced in response to the alternating electromagnetic field of corresponding frequency being received by the receiving device,
   each inductance connected to a rectifier for rectifying the alternating electric current and thereby producing a direct electric current,
   the rectifier comprises
      an automatically controllable switch which is arranged such that closing the switch results in a short circuit across the at least one inductance, or
      a plurality of automatically controllable switches which is arranged such that closing the switches results in a short circuit across the at least one inductance,
   the arrangement comprises a control device which is adapted to control the automatically controllable switch or the plurality of automatically controllable switches, and
   the control device is adapted to switch on and off the automatically controllable switch or the plurality of automatically controllable switches at a frequency which is smaller than the resonance frequency.

2. The arrangement of claim 1, wherein the receiving device comprises a plurality of phase lines of electrically conducting material, wherein each phase line comprises one of the inductances, each inductance being adapted to produce one of a plurality of phases of the alternating electric current and wherein the phase lines are connected to each other to form a star point connection at one end of the phase line and are connected to the rectifier at the opposite end of the phase line.

3. The arrangement of claim 2, wherein each of the opposite ends of the phase lines is connected to one of a plurality of bridges of the rectifier, wherein each bridge comprises two one-way valves which are connected in series to each other, wherein each valve is adapted to conduct an electric current in one direction only and wherein at least one of the valves of each bridge is a combined with one of the automatically controllable switches, so that—if the switch is on—an electric current can flow in the opposite direction through the valve or can bypass the valve in the opposite direction.

4. The arrangement of claim 1, wherein the at least one automatically controllable switch is combined with a valve of the rectifier, wherein the valve is adapted to conduct an electric current in one direction only and wherein—if the switch is on—an electric current can flow in the opposite direction through the valve or can bypass the valve in the opposite direction, wherein the control device is adapted to enable switching on the switch only while the size of the electric current through the valve is zero or is smaller than a predetermined threshold value.

5. The arrangement of claim 1, wherein the control device comprises a controller which is adapted to control a ratio of time intervals while each automatically controllable switch is on—and therefore the short circuit exists—to time intervals while each automatically controllable switch is off.

6. The arrangement of claim 1, wherein the control device is adapted to control the switching of each automatically controllable switch depending on the size(s) of the voltage and/or current at the direct current side of the rectifier.

7. The arrangement of claim 6, wherein the arrangement comprises a storage for storing electric energy which is delivered by the rectifier, wherein the rectifier is connected to the storage and wherein the control device is adapted to control the switching of each automatically controllable switch depending on the size(s) of the voltage and/or current which is required for charging the storage.

8. A vehicle comprising the arrangement of claim 1, wherein the rectifier is connected to a storage for storing electric energy.

9. A method of operating a vehicle, in particular a track bound vehicle and/or a road automobile, using electric energy, wherein
   an alternating electromagnetic field is received and is used to produce an alternating electric current by electromagnetic induction,
   the alternating electromagnetic field is received by one or more inductances, each of which is formed by an electrically conducting material and which produces one phase of the alternating electric current by the electromagnetic induction,
   each inductance produces one phase of the alternating electric current at a resonance frequency,
   the alternating electric current is rectified by a rectifier and thereby a direct electric current is produced,
   the rectifier is operated using an automatically controllable switch or a plurality of automatically controllable switches which, when temporarily closed effects a short circuit across the one or more inductances, and
   the at least one automatically controllable switch is controlled by a control device so that each automatically controllable switch is switched on and off at a frequency which is smaller than the resonance frequency.

10. The method of claim 9, wherein the alternating electric current is produced using a plurality of phase lines of electrically conducting material, wherein each phase line comprises one of the inductances which produces one of a plurality of phases of the alternating electric current.

11. The method of claim 9, wherein the rectifier comprises a valve which is used to rectify the alternating electric current, wherein the automatically controllable switch is combined with the valve, wherein the valve conducts—in a first operating state while the switch is off—an electric current in one direction only and the valve or a bypass of the valve can conduct—in a second operating state while the switch is on—an electric current in the opposite direction, wherein switching on the switch is enabled only while the size of the electric current through the valve is zero or is smaller than a predetermined threshold value.

12. The method of claim 9, wherein the ratio of the time intervals while each automatically controllable switch is on—and therefore the short circuit exists—to the time intervals while each automatically controllable switch is off is controlled by the control device.

13. The method of claim 9, wherein the control device controls the switching of each automatically controllable switch depending on the size(s) of the voltage and/or current at a direct current side of the rectifier.

14. The method of claim 13, wherein electric energy is delivered by the rectifier to an energy storage of the vehicle and wherein the control device controls the switching of each automatically controllable switch depending on the size(s) of the voltage and/or current which is required for charging the storage.

15. A method of manufacturing a vehicle, in particular a track bound vehicle and/or a road automobile, comprising the following steps:
  providing a receiving device adapted to receive an alternating electromagnetic field and to produce an alternating electric current by electromagnetic induction,
  providing for the receiving device one or more inductances, each of which is formed by an electrically conducting material for producing one phase of the alternating electric current by the electromagnetic induction,
  adapting each inductance in order to produce one phase of the alternating electric current, to operate at a resonance frequency at which the phase of the alternating electric current is produced in response to the alternating electromagnetic field of corresponding frequency being received by the receiving device,
  connecting each inductance to a rectifier for rectifying the alternating electric current and thereby producing a direct electric current,
  arranging an automatically controllable switch or a plurality of automatically controllable switches of the rectifier in such a manner that closing the switch or closing the plurality of the switches results in a short circuit across the one or more of inductances,
  providing a control device and adapting the control device so that it is able to control each automatically controllable switch and
  adapting the control device so that it is able to switch on and off each automatically controllable switch at a frequency which is smaller than the resonance frequency.

* * * * *